(12) United States Patent
Yang (10) Patent No.: US 10,135,671 B2
(45) Date of Patent: Nov. 20, 2018

(54) POLICY-BASED M2M TERMINAL DEVICE MONITORING AND CONTROL METHOD AND DEVICE

(71) Applicant: ZTE CORPORATION, Shenzhen (CN)

(72) Inventor: Kun Yang, Shenzhen (CN)

(73) Assignee: ZTE CORPORATION (CN)

( * ) Notice: Subject to any disclaimer, the term of this patent is extended or adjusted under 35 U.S.C. 154(b) by 0 days.

(21) Appl. No.: 15/324,825

(22) PCT Filed: Aug. 26, 2014

(86) PCT No.: PCT/CN2014/085200
§ 371 (c)(1),
(2) Date: Jan. 9, 2017

(87) PCT Pub. No.: WO2015/154366
PCT Pub. Date: Oct. 15, 2015

(65) Prior Publication Data
US 2017/0207954 A1    Jul. 20, 2017

(30) Foreign Application Priority Data

Jul. 9, 2014 (CN) .......................... 2014 1 0325796

(51) Int. Cl.
*H04M 3/00* (2006.01)
*H04L 12/24* (2006.01)
(Continued)

(52) U.S. Cl.
CPC ...... *H04L 41/0681* (2013.01); *H04L 41/0893* (2013.01); *H04L 43/0817* (2013.01);
(Continued)

(58) Field of Classification Search
CPC ...... H04W 8/245; H04W 4/005; H04L 12/14; H04L 41/0681; H04L 41/0893;
(Continued)

(56) References Cited

U.S. PATENT DOCUMENTS

2012/0087319 A1* 4/2012 Raleigh ................. H04W 48/18
370/329
2012/0096513 A1* 4/2012 Raleigh ................. H04W 24/10
726/1
(Continued)

FOREIGN PATENT DOCUMENTS

CN     102487488 A    6/2012
CN     102692897 A    9/2012
(Continued)

OTHER PUBLICATIONS

PCT International Search Report dated Apr. 16, 2015, Application No. PCT/CN2014/085200, 3 Pages.
(Continued)

*Primary Examiner* — Danh Le
(74) *Attorney, Agent, or Firm* — Plumsea Law Group, LLC (57) ABSTRACT

The present document discloses a method and device for monitoring and controlling an M2M terminal device based on a policy. An M2M platform obtains a state monitoring and control policy, stores a state control policy of the state monitoring and control policy, issues a state monitoring policy of the state monitoring and control policy, receives reported state information, and triggers a state control operation according to the state information and the state control policy. An M2M terminal device receives the state monitoring policy, triggers a state monitoring operation according to the state monitoring policy, reports monitored state information, receives operation information, and executes the
(Continued)

state control operation according to the operation information.

10 Claims, 4 Drawing Sheets

(51) Int. Cl.
*H04W 4/70* (2018.01)
*H04L 29/08* (2006.01)
*H04L 12/26* (2006.01)

(52) U.S. Cl.
CPC .......... *H04L 43/103* (2013.01); *H04L 67/104* (2013.01); *H04W 4/70* (2018.02)

(58) Field of Classification Search
CPC .............. H04L 43/0817; H04L 43/103; H04M 2215/32; H04M 1/72525
USPC .......................... 455/419, 405, 418; 709/225
See application file for complete search history.

(56) References Cited

U.S. PATENT DOCUMENTS

| | | | | |
|---|---|---|---|---|
| 2012/0176925 A1* | 7/2012 | Hwang | ................. | H04W 24/10 370/252 |
| 2012/0233324 A1* | 9/2012 | Zhou | ....................... | H04L 12/14 709/224 |
| 2013/0091281 A1* | 4/2013 | Chai | ....................... | H04L 12/14 709/225 |
| 2014/0022978 A1* | 1/2014 | Chen | ..................... | H04W 76/27 370/312 |
| 2014/0189075 A1 | 7/2014 | Stansell et al. | | |
| 2014/0274196 A1* | 9/2014 | Dai | ..................... | H04W 52/242 455/522 |
| 2015/0181415 A1* | 6/2015 | Raleigh | ................... | H04W 8/22 455/418 |
| 2015/0341851 A1* | 11/2015 | Cai | ......................... | H04W 4/08 455/434 |
| 2015/0382132 A1 | 12/2015 | Wu et al. | | |
| 2016/0057185 A1* | 2/2016 | Zhang | .................. | H04W 4/027 709/231 |
| 2016/0174055 A1* | 6/2016 | Wang | .................. | H04L 12/1407 370/259 |

FOREIGN PATENT DOCUMENTS

| | | |
|---|---|---|
| CN | 103702344 A | 4/2014 |
| CN | 103716822 A | 4/2014 |

OTHER PUBLICATIONS

Theofrastos Koulouris et al., "Towards a Framework for Dynamic Verification of Peer-to-Peer Systems", Second International Conference on Internet and Web Applications and Services (ICIW '07), 2007 IEEE, XP31096848A, 10 Pages.

Extended European Search Report dated Mar. 31, 2017, Application No. 14888881.1-1853 / 3154238, Applicant ZTE Corporation, 10 Pages.

Office Action dated Jan. 22, 2018, for European Patent Application No. 14888881.1.

* cited by examiner

POLICY-BASED M2M TERMINAL DEVICE MONITORING AND CONTROL METHOD AND DEVICE

CROSS-REFERENCE TO RELATED APPLICATIONS

This application is the U.S. national phase of PCT Application No. PCT/CN2014/085200 filed on Aug. 26, 2014, which claims priority to Chinese Patent Application No. 201410325796.8 filed on Jul. 9, 2014, the disclosures of which are incorporated in their entirety by reference herein.

TECHNICAL FIELD

The present document relates to a machine-to-machine/man (M2M) communication technology, and particularly to a method and device for monitoring and controlling an M2M terminal device based on a policy.

BACKGROUND

M2M communication system can be divided into three layers based on a logic function, including: a perceptual extension layer, a network/service layer and an application layer.

The perceptual extension layer: The perceptual extension layer mainly realizes collection, automatic identification and intelligent control of physical world information, and a main component included in it is an M2M terminal device. There are two types of M2M terminal device, one type is M2M terminal capable of communicating with M2M communication network, and the other is M2M gateway capable of communicating with the M2M communication network and M2M stub network.

The network/service layer: The network/service layer supports the transmission, routing and control of information of the perceptual extension layer, and supports the Internet of Things man-to-thing, thing-to-thing communication. The network layer specifically includes the following network forms based on classification of the Internet of Things: a communication network, an internet, an industry network, etc.; and a main component included in the network layer is an M2M platform.

The application layer: The application layer includes various specific applications of the Internet of Things: both public services and industry services. The industry services can be industry public services towards the public, also can be industry dedicated service for satisfying industry internal specific application requirements. A main component included in the application layer is an M2M application server, simply called M2M application.

However, in the related technology, the monitoring and control to the M2M terminal device by the M2M platform, i.e., the collection and related processing of various state parameters of the terminal device, can only be realized through platform active inquiring or terminal device active reporting according to platform defined period; the way of which is simple. However, the M2M terminal device is usually unattended, so requirements of the real-time, flexibility, etc., are requested on the monitoring and control method of the M2M terminal device.

SUMMARY

In order to solve existed technical problems of the related technology, embodiments of the present document provide a method and device for monitoring and controlling an M2M terminal device based on a policy.

An embodiment of the present document provides a method for monitoring and controlling a machine-to-machine (M2M) terminal device based on a policy, the method includes:

an M2M platform obtaining a state monitoring and control policy, storing a state control policy of the state monitoring and control policy, and issuing a state monitoring policy of the state monitoring and control policy;

the M2M platform receiving reported state information, and triggering a state control operation according to the state information and the state control policy.

In the above solution, the state monitoring policy includes: a condition value needed to be satisfied by the M2M terminal device executing collection and reporting operations of a state parameter, and an identifier of the state parameter corresponding to the condition value, or an event definition of the M2M terminal device executing event detection and reporting, and an event type identifier corresponding to the event definition;

the state control policy includes: a judgment logic of triggering the state control operation by the M2M platform based on the state parameter reported by the M2M terminal device, or a judgment logic of triggering the state control operation by the M2M platform based on the event type reported by the M2M terminal device.

In the above solution, triggering the state control operation according to the state information and state control policy includes:

the M2M platform receiving the state parameter reported by the M2M terminal device, judging whether the state parameter reaches a trigger threshold set in the state control policy, and triggering a corresponding state control operation according to a judgment result, specifically as follows:

1) if the state parameter does not reach the trigger threshold, then the M2M platform recording the state parameter, and the current state monitoring and control process ending;

2) if the state parameter reaches the trigger threshold, then the M2M platform sending operation information of a state control operation type corresponding to the trigger threshold to the M2M terminal device through an operation issue message;

or, the M2M platform receiving the event type identifier reported by the M2M terminal device, searching operation information of a state control operation type corresponding to the event type identifier in the state control policy, and sending the corresponding operation information to the M2M terminal device through an operation issue message.

An embodiment of the present document further provides a method for monitoring and controlling a machine-to-machine (M2M) terminal device based on a policy, the method includes:

an M2M terminal device receiving a state monitoring policy, triggering a state monitoring operation according to the state monitoring policy, and reporting monitored state information;

the M2M terminal device receiving operation information, and executing a state control operation according to the operation information.

In the above solution, the state monitoring policy includes: a condition value needed to be satisfied by the M2M terminal device executing collection and reporting operations of a state parameter, and an identifier of the state parameter corresponding to the condition value, or an event definition of the M2M terminal device executing event detection and reporting, and an event type identifier corresponding to the event definition.

In the above solution, triggering the state monitoring operation according to the state monitoring policy, and reporting the monitored state information include:

the M2M terminal device receiving the state monitoring policy, obtaining from the state monitoring policy the condition value needed to be satisfied by the M2M terminal device executing the collection and reporting operations of the state parameter and the identifier of the state parameter corresponding to the condition value, and when the condition value is satisfied, collecting the state parameter corresponding to the identifier of the relevant state parameter and reporting the collected state parameter;

or, the M2M terminal device receiving the state monitoring policy, obtaining from the state monitoring policy the event definition of the M2M terminal device executing the event detection and reporting and the event type identifier corresponding to the event definition, and reporting the event type identifier corresponding to the event definition when detecting occurrence of a relevant event according to the event definition.

An embodiment of the present document further provides method for monitoring and controlling a machine-to-machine (M2M) terminal device based on a policy, the method includes:

an M2M platform obtaining a state monitoring and control policy, storing a state control policy of the state monitoring and control policy, and issuing a state monitoring policy of the state monitoring and control policy;

the M2M terminal device receiving the state monitoring policy, triggering a state monitoring operation according to the state monitoring policy, and reporting monitored state information;

the M2M platform receiving the state information reported, and triggering a state control operation according to the state information and the state control policy;

the M2M terminal device receiving operation information, and executing the state control operation according to the operation information.

In the above solution, the method further includes: an M2M application generating the state monitoring and control policy according to state monitoring and control requirements of the M2M terminal device, and sending to the M2M platform through a policy issue message; wherein the policy issue message includes an identifier of the M2M terminal device and the state monitoring and control policy;

or, an M2M management configuring the state monitoring and control policy according to state monitoring and control requirements of the M2M terminal device, and inputting into the M2M platform through a local configuration instruction; wherein the local configuration instruction includes an identifier of the M2M terminal device and the state monitoring and control policy.

In the above solution, the state monitoring policy includes: a condition value needed to be satisfied by the M2M terminal device executing collection and reporting operations of a state parameter, and an identifier of the state parameter corresponding to the condition value, or, an event definition of the M2M terminal device executing event detection and reporting, and an event type identifier corresponding to the event definition;

the state control policy includes: a judgment logic of triggering the state control operation by the M2M platform based on the state parameter reported by the M2M terminal device, or a judgment logic of triggering the state control operation by the M2M platform based on the event type reported by the M2M terminal device.

An embodiment of the present document provides an M2M platform, the M2M platform includes: a policy obtaining module, a storage module, a policy issuing module and a control module; wherein, the policy obtaining module is arranged to obtain a state monitoring and control policy;

the storage module is arranged to store a state control policy of the state monitoring and control policy;

the policy issuing module is arranged to issue a state monitoring policy of the state monitoring and control policy; and the control module is arranged to receive reported state information, and trigger a state control operation according to the state information and the state control policy.

In the above solution, the state monitoring policy includes: a condition value needed to be satisfied by the M2M terminal device executing collection and reporting operations of a state parameter, and an identifier of the state parameter corresponding to the condition value, or an event definition of the M2M terminal device executing event detection and reporting, and an event type identifier corresponding to the event definition;

the state control policy includes: a judgment logic of triggering the state control operation by the M2M platform based on the state parameter reported by the M2M terminal device, or a judgment logic of triggering the state control operation by the M2M platform based on the event type reported by the M2M terminal device.

In the above solution, the control module is arranged to receive the state parameter reported by the M2M terminal device, judge whether the state parameter reaches a trigger threshold set in the state control policy, and trigger a corresponding state control operation according to a judgment result, wherein:

1) if the state parameter does not reach the trigger threshold, then sending the state parameter to the storage module for recording, and the current state monitoring and control process ending;

2) if the state parameter reaches the trigger threshold, then sending operation information of a state control operation type corresponding to the trigger threshold to the M2M terminal device through an operation issue message;

or, the control module is arranged to: receiving the event type identifier reported by the M2M terminal device, searching operation information of a state control operation type corresponding to the event type identifier in the state control policy, and sending the corresponding operation information to the M2M terminal device through an operation issue message.

An embodiment of the present document provides an M2M terminal device, the M2M terminal device includes: a monitoring module and an operation executive module; wherein, the monitoring module is arranged to: receive a state monitoring policy, trigger a state monitoring operation according to the state monitoring policy, and report monitored state information;

the operation executive module is arranged to: receive operation information, and execute a state control operation according to the operation information.

In the above solution, the monitoring module is arranged to receive the state monitoring policy, obtain from the state monitoring policy the condition value needed to be satisfied by the M2M terminal device executing the collection and reporting operations of the state parameter and the identifier of the state parameter corresponding to the condition value, collect the state parameter corresponding to the identifier of the relevant state parameter and report the collected state parameter;

or, the monitoring module is arranged to receive the state monitoring policy, obtain from the state monitoring policy the event definition of the M2M terminal device executing the event detection and reporting and the event type identifier corresponding to the event definition, and report the event type identifier corresponding to the event definition when detecting occurrence of a relevant event according to the event definition.

An embodiment of the present document further provides a system for monitoring and controlling a machine-to-machine (M2M) terminal device based on a policy, the system includes: an M2M platform and an M2M terminal device; wherein, the M2M platform is arranged to: obtain a state monitoring and control policy, store a state control policy of the state monitoring and control policy, issue a state monitoring policy of the state monitoring and control policy, receive reported state information, and trigger a state control operation according to the state information and the state control policy; and the M2M terminal device is arranged to: receive the state monitoring policy, trigger a state monitoring operation according to the state monitoring policy, report the state information monitored, receive operation information, and execute a state control operation according to the operation information.

In the above solution, the state monitoring policy includes: a condition value needed to be satisfied by the M2M terminal device executing collection and reporting operations of a state parameter, and an identifier of the state parameter corresponding to the condition value, or an event definition of the M2M terminal device executing event detection and reporting, and an event type identifier corresponding to the event definition;

the state control policy includes: a judgment logic of triggering the state control operation by the M2M platform based on the state parameter reported by the M2M terminal device, or a judgment logic of triggering the state control operation by the M2M platform based on the event type reported by the M2M terminal device.

In the above solution, the system further includes: an M2M application, arranged to generate the state monitoring and control policy according to state monitoring and control requirements of the M2M terminal device, and send to the M2M platform through a policy issue message; wherein the policy issue message includes an identifier of the M2M terminal device and the state monitoring and control policy;

the system further includes: an M2M management, arranged to configure the state monitoring and control policy according to state monitoring and control requirements of the M2M terminal device, and input into the M2M platform through a local configuration instruction; wherein the local configuration instruction includes an identifier of the M2M terminal device and the state monitoring and control policy.

The embodiments of the present document provide a method and apparatus for monitoring and controlling an M2M terminal device based on a policy. An M2M platform obtains a state monitoring and control policy, stores a state control policy of the state monitoring and control policy, issues a state monitoring policy of the state monitoring and control policy, receives reported state information, and triggers a state control operation according to the state information and the state control policy. An M2M terminal device receives the state monitoring policy, triggers a state monitoring operation according to the state monitoring policy, reports monitored state information, receives operation information, and executes the state control operation according to the operation information. Thus, the monitoring and control of the M2M terminal device is in real-time and flexible, and the management efficiency of the M2M system to the M2M terminal device is improved.

EMBODIMENTS OF THE PRESENT DOCUMENT

In an embodiment of the present document, an M2M platform obtains a state monitoring and control policy, stores a state control policy of the state monitoring and control policy, issues a state monitoring policy of the state monitoring and control policy, receives reported state information, and triggers a state control operation according to the state information and the state control policy. An M2M terminal device receives the state monitoring policy, triggers a state monitoring operation according to the state monitoring policy, reports monitored state information, receives operation information, and executes the state control operation according to the operation information.

Hereinafter, the embodiments of the present document are illustrated in detail through drawings, and the embodiments of the present document and features of each embodiment can be combined with each other randomly without conflict.

Figure 1:
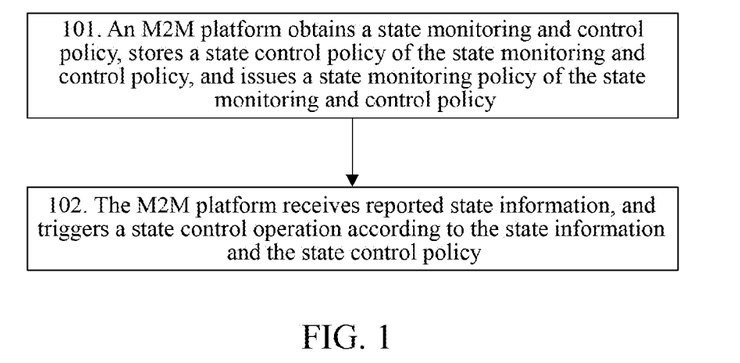
FIG. 1 is a flowchart of realizing a method for monitoring and controlling a machine-to-machine (M2M) terminal device based on a policy on a platform side according to an embodiment of the present document.

An embodiment of the present document realizes a method for monitoring and controlling an M2M terminal device based on a policy, as shown in FIG. 1, the method includes the following steps.

In step 101: an M2M platform obtains a state monitoring and control policy, stores a state control policy of the state monitoring and control policy, and issues a state monitoring policy of the state monitoring and control policy.

The M2M platform can receive the state monitoring and control policy from an M2M application or an M2M management. The state monitoring and control policy includes: the state monitoring policy and the state control policy. The state monitoring policy includes: a condition value needed to be satisfied by the M2M terminal device executing collection and reporting operations of a state parameter, and an identifier of the state parameter corresponding to the condition value, or, an event definition of the M2M terminal device executing event detection and reporting, and an event type identifier corresponding to the event definition. The state control policy includes: a judgment logic of triggering the state control operation by the M2M platform based on the state parameter reported by the M2M terminal device, or a judgment logic of triggering the state control operation by the M2M platform based on the event type reported by the M2M terminal device. The M2M platform stores the state control policy of the state monitoring and control policy, and issues the state monitoring policy of the state monitoring and control policy.

In step 102: the M2M platform receives reported state information, and triggers a state control operation according to the state information and the state control policy.

In this step, the M2M platform receives a state parameter reported by the M2M terminal device, judges whether the state parameter reaches a trigger threshold set in the state control policy, and triggers the corresponding state control operation according to the judgment result, in which:

1) if the state parameter does not reach the trigger threshold, then the M2M platform records the state parameter, and the current state monitoring and control process ends;

2) if the state parameter reaches the trigger threshold, then the M2M platform sends operation information of a state control operation type corresponding to the trigger threshold to the M2M terminal device through an operation issue message;

or, the M2M platform receives the event type identifier reported by the M2M terminal device, searches operation information of a state control operation type corresponding to the event type identifier in the state control policy, and sends the corresponding operation information to the M2M terminal device through an operation issue message.

The method of the embodiment further includes: the M2M platform receives an operation executive result, and records the operation executive result.

Figure 2:
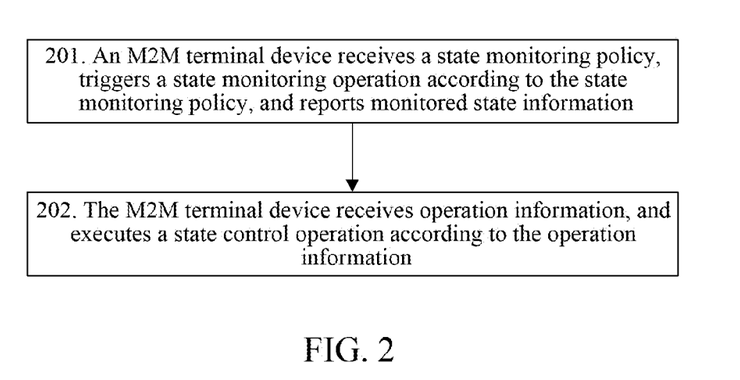
FIG. 2 is a processing flowchart of realizing a method for monitoring and controlling a machine-to-machine (M2M) terminal device based on a policy on a terminal side according to an embodiment of the present document.

Correspondingly, an embodiment of the present document realizes another method for monitoring and controlling an M2M terminal device based on a policy, as shown in FIG. 2, the method includes the following step.

In step 201: the M2M terminal device receives a state monitoring policy, triggers a state monitoring operation according to the state monitoring policy, and reports monitored state information.

Here, the state monitoring policy includes: a condition value needed to be satisfied by the M2M terminal device executing collection and reporting operations of a state parameter, and an identifier of the state parameter corresponding to the condition value, or, an event definition of the M2M terminal device executing event detection and reporting, and an event type identifier corresponding to the event definition.

The M2M terminal device receives the state monitoring policy, obtains from the state monitoring policy the condition value needed to be satisfied by the M2M terminal device executing the collection and reporting operations of the state parameter and the identifier of the state parameter corresponding to the condition value, and when the condition value is satisfied, collects the state parameter corresponding to the identifier of the relevant state parameter and reports the collected state parameter;

or, the M2M terminal device receives the state monitoring policy, obtains from the state monitoring policy the event definition of the M2M terminal device executing the event detection and reporting and the event type identifier corresponding to the event definition, and reports the event type identifier corresponding to the event definition when detecting occurrence of a relevant event according to the event definition.

In step 202: the M2M terminal device receives operation information, and executes a state control operation according to the operation information.

In this step, the M2M terminal device receives an operation issue message sent by the M2M platform, reads the operation information included in the operation issue message, and executes the corresponding operation according to the operation information. For example, the operation information can be reducing power, decreasing load, initializing configurations, parameter configuration, etc.

The method of the embodiment further includes: the M2M terminal device feeds back an operation executive result to the M2M platform after executing the operation.

Figure 3:
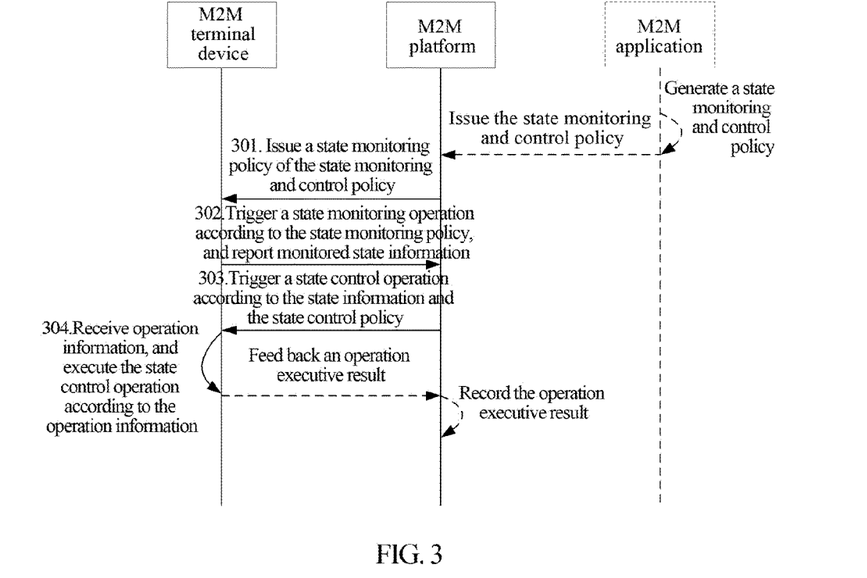
FIG. 3 is a flowchart of realizing a whole method for monitoring and controlling a machine-to-machine (M2M) terminal device based on a policy according to an embodiment of the present document.

Based on the above embodiments, an embodiment of the present document realizes a third method for monitoring and controlling an M2M terminal device based on a policy, as shown in FIG. 3, the method includes the following step.

In step 301: an M2M platform obtains a state monitoring and control policy, stores a state control policy of the state monitoring and control policy, and issues a state monitoring policy of the state monitoring and control policy.

The M2M platform can receive the state monitoring and control policy from an M2M application or an M2M management. The state monitoring and control policy includes: the state monitoring policy and the state control policy. The state monitoring policy includes: a condition value needed to be satisfied by the M2M terminal device executing collection and reporting operations of a state parameter, and an identifier of the state parameter corresponding to the condition value, or, an event definition of the M2M terminal device executing event detection and reporting, and an event type identifier corresponding to the event definition. The state control policy includes: a judgment logic of triggering the state control operation by the M2M platform based on the state parameter reported by the M2M terminal device, or a judgment logic of triggering the state control operation by the M2M platform based on the event type reported by the M2M terminal device. The M2M platform stores the state control policy of the state monitoring and control policy, and issues the state monitoring policy of the state monitoring and control policy.

Before step 301, the method further includes: the M2M application generates the state monitoring and control policy according to state monitoring and control requirements of the M2M terminal device, and sends to the M2M platform through a policy issue message. The policy issue message includes an identifier of the M2M terminal device and the state monitoring and control policy.

Before step 301, the method further includes: the M2M management configures the state monitoring and control policy according to state monitoring and control requirements of the M2M terminal device, and inputs into the M2M platform through a local configuration instruction. The local configuration instruction includes an identifier of the M2M terminal device and the state monitoring and control policy.

In step 302: the M2M terminal device receives a state monitoring policy, triggers a state monitoring operation according to the state monitoring policy, and reports monitored state information.

Here, the state monitoring policy includes: a condition value needed to be satisfied by the M2M terminal device executing collection and reporting operations of a state parameter, and an identifier of the state parameter corresponding to the condition value, or, the state monitoring policy includes: an event definition of the M2M terminal device executing event detection and reporting, and an event type identifier corresponding to the event definition.

The M2M terminal device receives the state monitoring policy, obtains from the state monitoring policy the condition value needed to be satisfied by the M2M terminal device executing the collection and reporting operations of the state parameter and the identifier of the state parameter corresponding to the condition value, and when the condition value is satisfied, collects the state parameter corresponding to the identifier of the relevant state parameter and reports the collected state parameter;

or, the M2M terminal device receives the state monitoring policy, obtains from the state monitoring policy the event definition of the M2M terminal device executing the event detection and reporting and the event type identifier corresponding to the event definition, and reports the event type identifier corresponding to the event definition when detecting occurrence of a relevant event according to the event definition.

In step 303: the M2M platform receives reported state information, and triggers a state control operation according to the state information and the state control policy.

In the step, the M2M platform receives a state parameter reported by the M2M terminal device, judges whether the state parameter reaches a trigger threshold set in the state control policy, and triggers the corresponding state control operation according to the judgment result, in which:

1) if the state parameter does not reach the trigger threshold, then the M2M platform records the state parameter, and the current state monitoring and control process ends;

2) if the state parameter reaches the trigger threshold, then the M2M platform sends operation information of a state control operation type corresponding to the trigger threshold to the M2M terminal device through an operation issue message;

or, the M2M platform receives the event type identifier reported by the M2M terminal device, searches operation information of a state control operation type corresponding to the event type identifier in the state control policy, and sends the corresponding operation information to the M2M terminal device through an operation issue message.

In step 304: the M2M terminal device receives operation information, and executes a state control operation according to the operation information.

In the step, the M2M terminal device receives an operation issue message sent by the M2M platform, reads the operation information included in the operation issue message, and executes the corresponding operation according to the operation information, such as reducing power, decreasing load, initializing configurations, parameter configuration, etc.

The method of the embodiment further includes: the M2M terminal device feeds back an operation executive result to the M2M platform after executing the operation; and, the M2M platform receives the operation executive result and records the operation executive result.

Figure 4:
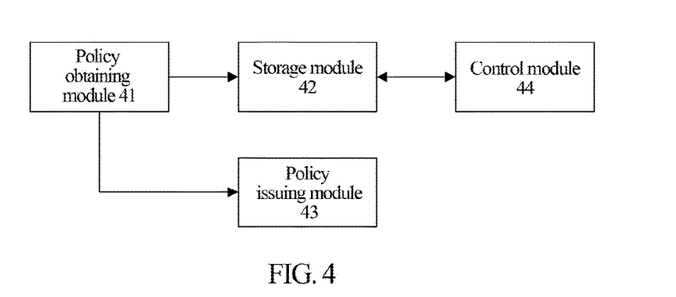
FIG. 4 is a structural schematic diagram of an M2M platform provided in an embodiment of the present document.

Based on the above method, the embodiment of the present document provides an M2M platform, as shown in FIG. 4, the M2M platform includes: a policy obtaining module 41, a storage module 42, a policy issuing module 43 and a control module 44; in which, the policy obtaining module 41 is arranged to obtain a state monitoring and control policy; the storage module 42 is arranged to store a state control policy of the state monitoring and control policy;

the policy issuing module 43 is arranged to issue a state monitoring policy of the state monitoring and control policy;

the control module 44 is arranged to receive reported state information, and triggering a state control operation according to the state information and the state control policy.

The state monitoring and control policy includes: the state monitoring policy and the state control policy. The state monitoring policy includes: a condition value needed to be satisfied by the M2M terminal device executing collection and reporting operations of a state parameter, and an identifier of the state parameter corresponding to the condition value, or, the state monitoring policy includes: an event definition of the M2M terminal device executing event detection and reporting, and an event type identifier corresponding to the event definition. The state control policy includes: a judgment logic of triggering the state control operation by the M2M platform based on the state parameter reported by the M2M terminal device, or a judgment logic of triggering the state control operation by the M2M platform based on the event type reported by the M2M terminal device.

The control module 44 is arranged to receive the state parameter reported by the M2M terminal device, judge whether the state parameter reaches a trigger threshold set in the state control policy, and trigger a corresponding state control operation according to a judgment result, in which:

1) if the state parameter does not reach the trigger threshold, then sending the state parameter to the storage module 42 for recording, and the current state monitoring and control process ending;

2) if the state parameter reaches the trigger threshold, then sending operation information of a state control operation type corresponding to the trigger threshold to the M2M terminal device through an operation issue message;

or, the control module 44 receives the event type identifier reported by the M2M terminal device, searches operation information of a state control operation type corresponding to the event type identifier in the state control policy, and sends the corresponding operation information to the M2M terminal device through an operation issue message.

The storage module 42 is further arranged to receive an operation executive result, and recording the operation executive result.

Figure 5:
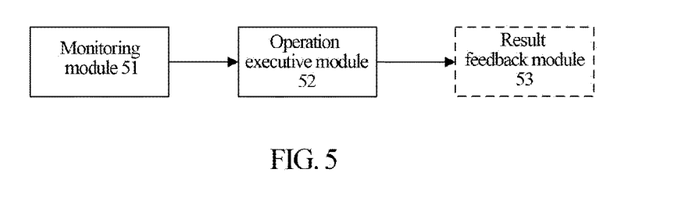
FIG. 5 is a structural schematic diagram of an M2M terminal device provided in an embodiment of the present document.

An embodiment of the present document further provides an M2M terminal device, as shown in FIG. 5, the M2M terminal device includes: a monitoring module 51 and an operation executive module 52; in which, the monitoring module 51 is arranged to receive a state monitoring policy, trigger a state monitoring operation according to the state monitoring policy, and report monitored state information;

the operation executive module 52 is arranged to receive operation information, and execute a state control operation according to the operation information.

The state monitoring policy includes: a condition value needed to be satisfied by the M2M terminal device executing collection and reporting operations of a state parameter, and an identifier of the state parameter corresponding to the condition value, or the state monitoring policy includes: an event definition of the M2M terminal device executing event detection and reporting, and an event type identifier corresponding to the event definition.

Herein, the monitoring module 51 is arranged to receive the state monitoring policy, obtain from the state monitoring policy the condition value needed to be satisfied by the M2M terminal device executing the collection and reporting operations of the state parameter and the identifier of the state parameter corresponding to the condition value, collect the state parameter corresponding to the identifier of the relevant state parameter and report the collected state parameter;

or, the monitoring module 51 is arranged to receive the state monitoring policy, obtain from the state monitoring policy the event definition of the M2M terminal device executing the event detection and reporting and the event type identifier corresponding to the event definition, and report the event type identifier corresponding to the event definition when detecting occurrence of a relevant event according to the event definition.

The operation executive module 52 is arranged to receive an operation issue message sent by the M2M platform, read the operation information included in the operation issue message, and execute the corresponding operation according to the operation information, such as reducing power, decreasing load, initializing configurations, parameter configuration, etc.

The M2M terminal device further includes: a result feedback module 53, arranged to feed back an operation executive result to the M2M platform.

Figure 6:
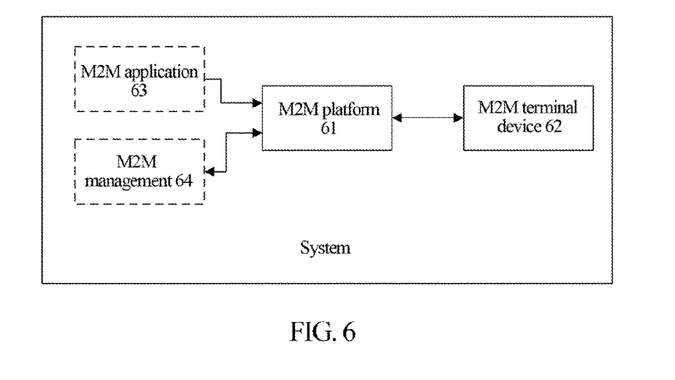
FIG. 6 is a structural schematic diagram of a system for monitoring and controlling a machine-to-machine (M2M) terminal device based on a policy according to an embodiment of the present document.

Based on the above M2M platform and the above M2M terminal device, an embodiment of the present document further provides a system for monitoring and controlling an M2M terminal device based on a policy, as shown in FIG. 6, the system includes: an M2M platform 61 and an M2M terminal device 62; in which, the M2M platform 61 is arranged to obtain a state monitoring and control policy, store a state control policy of the state monitoring and control policy, issue a state monitoring policy of the state monitoring and control policy, receive reported state information, and trigger a state control operation according to the state information and the state control policy; and the M2M terminal device 62 is arranged to receive the state monitoring policy, trigger a state monitoring operation according to the state monitoring policy, report the state information monitored, receive operation information, and execute a state control operation according to the operation information.

The state monitoring and control policy includes: the state monitoring policy and the state control policy. The state monitoring policy includes: a condition value needed to be satisfied by the M2M terminal device 62 executing collection and reporting operations of a state parameter, and an identifier of the state parameter corresponding to the condition value, or the state monitoring policy includes: an event definition of the M2M terminal device 62 executing event detection and reporting, and an event type identifier corresponding to the event definition. The state control policy includes: a judgment logic of triggering the state control operation by the M2M platform 61 based on the state parameter reported by the M2M terminal device 62 or a judgment logic of triggering the state control operation by the M2M platform 61 based on the event type reported by the M2M terminal device 62.

The system further includes: an M2M application 63, arranged to generate the state monitoring and control policy according to state monitoring and control requirements of the M2M terminal device 62, and send to the M2M platform 61 through a policy issue message; the policy issue message includes an identifier of the M2M terminal device 62 and the state monitoring and control policy.

Or, the system further includes: an M2M management 64, arranged to configure the state monitoring and control policy according to state monitoring and control requirements of the M2M terminal device 62, and input into the M2M platform 61 through a local configuration instruction; the local configuration instruction includes an identifier of the M2M terminal device 62 and the state monitoring and control policy.

In order to understand the present document better, the present document is further illustrated in combination with the specific embodiments below.

Embodiment 1

Figure 7:
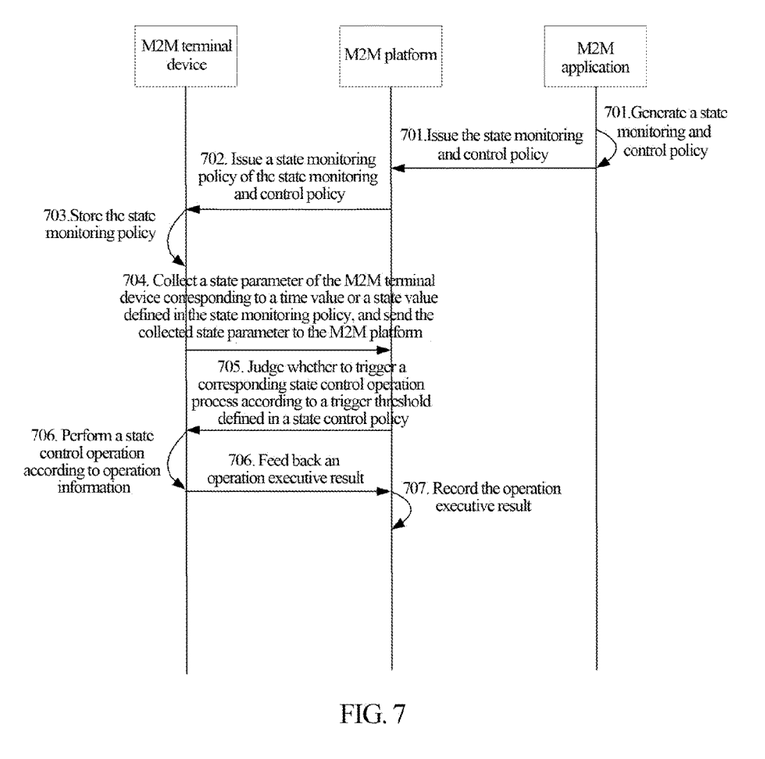
FIG. 7 is a flowchart of a method for monitoring and controlling a machine-to-machine (M2M) terminal device based on a policy according to embodiment 1 of the present document.

This embodiment realizes a method for monitoring and controlling an M2M terminal device based on a policy, as shown in FIG. 7, the method includes the following step.

In step 701: an M2M application generates a state monitoring and control policy according to the state monitoring and control requirements of the M2M terminal device, and sends it to the M2M platform through a policy issue message; the policy issue message includes an identifier of the M2M terminal device and the state monitoring and control policy.

It should be illustrated that, the state monitoring and control policy includes: a state monitoring policy and a state control policy. The state monitoring policy includes: a condition value needed to be satisfied by the M2M terminal device executing collection and reporting operations of a state parameter, and an identifier of the state parameter corresponding to the condition value. The state control policy includes a judgment logic of triggering the state control operation by the M2M platform based on the state parameter reported by the M2M terminal device.

The condition value can be a time value of a system clock or a timer corresponding to the M2M terminal device, which is a designated moment or frequency, and an example is as follows:

| Condition value | State parameter identifier |
| --- | --- |
| time value #1 | state parameter a, state parameter b |
| time value #2 | state parameter c |
| ... | ... |

Or, the condition value can be a state value of one or multiple operation states corresponding to the M2M terminal device, such as a parameter of work temperature, system load, etc., and an example is as follows:

| Condition value | State parameter identifier |
| --- | --- |
| state value #1 | state parameter d |
| state value #2, state value #3 | state parameter e |
| ... | ... |

The judgment logic refers to: when the M2M platform detects that the state parameter reported by the M2M terminal device reaches a preset trigger threshold, the M2M platform correspondingly triggers a control operation process, such as power adjusting, load balancing, etc., and an example is as follows:

| State parameter identifier | Trigger threshold | Operation type |
|---|---|---|
| state parameter f | threshold #1 | operation process I, operation process II |
| state parameter g, state parameter h | threshold #2, threshold #3 | operation process III |
| ... | ... | ... |

In step 702: the M2M platform receives the policy issue message sent by the M2M application, analyzes the state monitoring and control policy therein, stores the state control policy which corresponds to the state of the M2M terminal device and is included in the state monitoring and control policy, and sends the state monitoring policy included in the state monitoring and control policy to the M2M terminal device through the policy issue message.

In step 703: after receiving the policy issue message sent by the M2M platform, the M2M terminal device reads the state monitoring policy included in the policy issue message, and stores in local configuration information.

In step 704: the M2M terminal device, when detecting that the time value of the system clock or the timer reaches a time value defined in the state monitoring policy, or the operation state satisfies a state value defined in the state monitoring policy, collects the state parameter of the M2M terminal device corresponding to the time value or state value defined in the state monitoring policy, and sends the collected state parameter to the M2M platform through a state report message.

In step 705: the M2M platform receives the state report message sent by the M2M terminal device, reads the state parameter included in the state report message, and judges whether to trigger the corresponding state control operation process according to the trigger threshold defined in the state control policy:

1) if the state parameter reported by the M2M terminal device does not reach the trigger threshold, then the M2M platform records the state parameter reported by the M2M terminal device, and the current state monitoring and control process ends;

2) if the state parameter reported by the M2M terminal device reaches the trigger threshold, then the M2M platform sends operation information of the state control operation type corresponding to the trigger threshold to the M2M terminal device through an operation issue message.

In step 706: the M2M terminal device receives the operation issue message sent by the M2M platform, reads the operation information included in the operation issue message, executes the corresponding operation, such as reducing power, decreasing load, etc., and feeds back an operation executive result to the M2M platform.

The operation executive result includes: an operation executive success indicator and a state value of the M2M terminal device after executing the operation successfully, or an operation failure indicator and a reason value of the failure.

The operation executive result can include the following two conditions:
1) success indicator+state value;
2) failure indicator+reason value.

In step 707: the M2M platform receives the operation executive result reported by the M2M terminal device, and records the current operation executive result.

Embodiment 2

Figure 8:
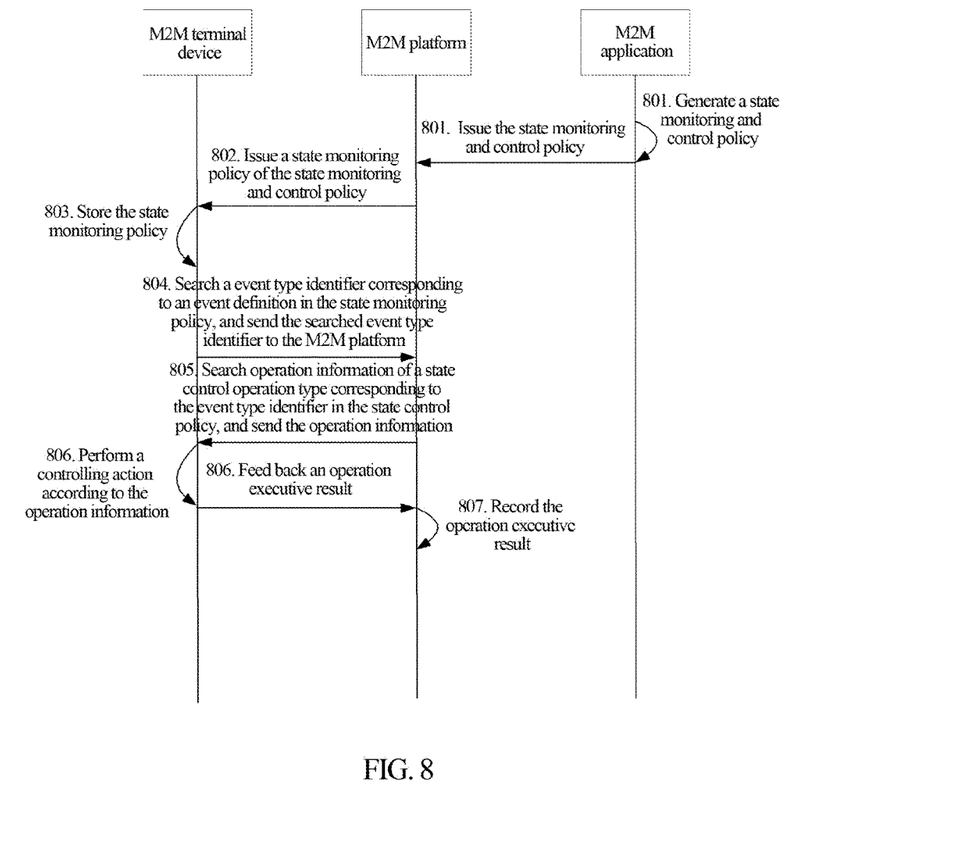
FIG. 8 is a flowchart of a method for monitoring and controlling a machine-to-machine (M2M) terminal device based on a policy according to embodiment 2 of the present document.

This embodiment realizes a method for monitoring and controlling an M2M terminal device based on a policy, and as shown in FIG. 8, the method includes the following step.

In step 801: an M2M application generates a state monitoring and control policy according to the state monitoring and control requirements of the M2M terminal device, and sends it to the M2M platform through a policy issue message; the policy issue message includes an identifier of the M2M terminal device and the state monitoring and control policy.

It should be illustrated that, the state monitoring and control policy includes: a state monitoring policy and a state control policy. The state monitoring policy includes: an event definition of the M2M terminal device executing event detection and reporting, and an event type identifier corresponding to the event definition; and the state control policy includes a judgment logic of triggering the state control operation by the M2M platform based on the event type reported by the M2M terminal device.

The event definition can be pre-defined activity of the M2M terminal device, such as system restart, fault alarm, etc., and an example is as follows:

| Event definition | Event type identifier |
|---|---|
| event definition #1 | event type A |
| event definition #2 | event type B |
| ... | ... |

The judgment logic refers to that: event type identifier reported by the M2M terminal device is corresponding to the operation information triggered by the M2M platform, such as initialization scheme issue, configuration parameter issue, etc., and an example is as follows:

| Event type identifier | Operation type |
|---|---|
| event type C | operation information IV |
| event type D | operation information V, operation information VI |
| ... | ... |

In step 802: the M2M platform receives the policy issue message sent by the M2M application, analyzes the state monitoring and control policy therein, stores the state control policy which corresponds to the state of the M2M terminal device and is included in the state monitoring and control policy, and sends the state monitoring policy included in the state monitoring and control policy to the M2M terminal device through the policy issue message.

In step 803: after receiving the policy issue message sent by the M2M platform, the M2M terminal device reads the state monitoring policy included in the policy issue message, and stores in local configuration information.

In step 804: the M2M terminal device, when detecting that an event defined in the state monitoring policy occurs, searches an event type identifier corresponding to the event definition in the state monitoring policy, and sends the searched event type identifier to the M2M platform through a state report message.

In step 805: the M2M platform receives the state report message sent by the M2M terminal device, reads the event type identifier included in the state report message, searches the operation information of a state control operation type corresponding to the event type identifier in the state control policy, and sends the operation information to the M2M terminal device through an operation issue message.

In step 806: the M2M terminal device receives the operation issue message sent by the M2M platform, reads the operation information included in the operation issue message, executes the corresponding control operation, such as executing initializing configuration, parameter configuration, etc., and feeds back an operation executive result to the M2M platform.

The operation executive result includes an operation executive success indicator, or an executive failure indicator and a reason value of the failure.

In step 807: the M2M platform receives the operation executive result reported by the M2M terminal device, and records the current operation executive result.

The above descriptions are only the preferred embodiments of the present document and not intended to limit the protection scope of the present document. Any modification, equivalent replacement and improvement, etc., within the spirit and principle of the present document should be contained in the protection scope of the present document.

INDUSTRIAL APPLICABILITY

The monitoring and control to an M2M terminal device in embodiments of the present document is in real-time, flexible, and the management efficiency of the M2M system to the M2M terminal device is improved.

What I claim is:

1. A method for monitoring and controlling a machine-to-machine (M2M) terminal device based on a policy, the method comprising:
    obtaining, by an M2M platform, a state monitoring and control policy, storing a state control policy of the state monitoring and control policy, and issuing a state monitoring policy of the state monitoring and control policy;
    receiving, by the M2M platform, state information reported by the M2M terminal device, and triggering a state control operation according to the state information and the state control policy,
    wherein the state monitoring policy comprises:
        a condition value needed to be satisfied by the M2M terminal device executing collection and reporting operations of a state parameter, and an identifier of the state parameter corresponding to the condition value, or
        an event definition of the M2M terminal device executing event detection and reporting, and an event type identifier corresponding to the event definition;
    the state control policy comprises:
        a judgment logic of triggering the state control operation by the M2M platform based on the state parameter reported by the M2M terminal device, or a judgment logic of triggering the state control operation by the M2M platform based on the event type reported by the M2M terminal device,
    wherein, triggering the state control operation according to the state information and state control policy comprises:
        the M2M platform receiving the state parameter reported by the M2M terminal device, judging whether the state parameter reaches a trigger threshold set in the state control policy, and triggering a corresponding state control operation according to a judgment result, wherein, triggering the corresponding state control operation according to the judgment result comprises:
            if the state parameter does not reach the trigger threshold, then the M2M platform recording the state parameter, and the current state monitoring and control process ending;
            if the state parameter reaches the trigger threshold, then the M2M platform sending operation information of a state control operation type corresponding to the trigger threshold to the M2M terminal device through an operation issue message;
    or, triggering the state control operation according to the state information and the state control policy comprises:
        the M2M platform receiving the event type identifier reported by the M2M terminal device, searching operation information of a state control operation type corresponding to the event type identifier in the state control policy, and sending the corresponding operation information to the M2M terminal device through an operation issue message.

2. The method according to claim 1 further comprising:
    the M2M terminal device receiving the state monitoring policy, triggering a state monitoring operation according to the state monitoring policy, and reporting monitored state information; and
    the M2M terminal device receiving operation information, and executing the state control operation according to the operation information.

3. The method according to claim 2, further comprising:
    an M2M application generating the state monitoring and control policy according to state monitoring and control requirements of the M2M terminal device, and sending to the M2M platform through a policy issue message; wherein the policy issue message comprises an identifier of the M2M terminal device and the state monitoring and control policy;
    or, an M2M management configuring the state monitoring and control policy according to state monitoring and control requirements of the M2M terminal device, and inputting into the M2M platform through a local configuration instruction;
    wherein the local configuration instruction comprises an identifier of the M2M terminal device and the state monitoring and control policy.

4. The method according to claim 2, wherein,
    the state monitoring policy comprises:
        a condition value needed to be satisfied by the M2M terminal device executing collection and reporting operations of a state parameter, and an identifier of the state parameter corresponding to the condition value, or, an event definition of the M2M terminal device executing event detection and reporting, and an event type identifier corresponding to the event definition;
    the state control policy comprises:
        a judgment logic of triggering the state control operation by the M2M platform based on the state parameter reported by the M2M terminal device, or a judgment logic of triggering the state control operation by the M2M platform based on the event type reported by the M2M terminal device.

5. A method for monitoring and controlling a machine-to-machine (M2M) terminal device based on a policy, the method comprising:
an M2M terminal device receiving a state monitoring policy, triggering a state monitoring operation according to the state monitoring policy, and reporting monitored state information;
the M2M terminal device receiving operation information, and executing a state control operation according to the operation information,
wherein, the state monitoring policy comprises:
a condition value needed to be satisfied by the M2M terminal device executing collection and reporting operations of a state parameter, and an identifier of the state parameter corresponding to the condition value, or
an event definition of the M2M terminal device executing event detection and reporting, and an event type identifier corresponding to the event definition;
wherein, triggering the state monitoring operation according to the state monitoring policy, and reporting the monitored state information comprise:
the M2M terminal device receiving the state monitoring policy, obtaining from the state monitoring policy the condition value needed to be satisfied by the M2M terminal device executing the collection and reporting operations of the state parameter and the identifier of the state parameter corresponding to the condition value, and when the condition value is satisfied, collecting the state parameter corresponding to the identifier of the relevant state parameter and reporting the collected state parameter;
or, the M2M terminal device receiving the state monitoring policy, obtaining from the state monitoring policy the event definition of the M2M terminal device executing the event detection and reporting and the event type identifier corresponding to the event definition, and reporting the event type identifier corresponding to the event definition when detecting occurrence of a relevant event according to the event definition.

6. A machine-to-machine (M2M) platform, the M2M platform comprising a processor and a storage device, wherein the storage device stores processor-executable programs, and the programs comprise:
a policy obtaining module, a storage module, a policy issuing module and a control module; wherein,
the policy obtaining module is arranged to obtain a state monitoring and control policy;
the storage module is arranged to store a state control policy of the state monitoring and control policy;
the policy issuing module is arranged to issue a state monitoring policy of the state monitoring and control policy; and
the control module is arranged to receive state information reported by a M2M terminal device, and trigger a state control operation according to the state information and the state control policy,
wherein, the state monitoring policy comprises:
a condition value needed to be satisfied by the M2M terminal device executing collection and reporting operations of a state parameter, and an identifier of the state parameter corresponding to the condition value, or
an event definition of the M2M terminal device executing event detection and reporting, and an event type identifier corresponding to the event definition;
the state control policy comprises:
a judgment logic of triggering the state control operation by the M2M platform based on the state parameter reported by the M2M terminal device, or a judgment logic of triggering the state control operation by the M2M platform based on the event type reported by the M2M terminal device;
wherein, the control module is arranged to:
receive the state parameter reported by the M2M terminal device, judge whether the state parameter reaches a trigger threshold set in the state control policy, and trigger a corresponding state control operation according to a judgment result, wherein, triggering the corresponding state control operation according to the judgment result comprises:
1) if the state parameter does not reach the trigger threshold, then sending the state parameter to the storage module for recording, and the current state monitoring and control process ending;
2) if the state parameter reaches the trigger threshold, then sending operation information of a state control operation type corresponding to the trigger threshold to the M2M terminal device through an operation issue message;
or, the control module is arranged to:
receive receiving the event type identifier reported by the M2M terminal device, search searching operation information of a state control operation type corresponding to the event type identifier in the state control policy, and send sending the corresponding operation information to the M2M terminal device through an operation issue message.

7. A system for monitoring and controlling a machine-to-machine (M2M) terminal device based on a policy, the system comprising:
an M2M platform according to claim 6 and an M2M terminal device comprising a monitoring module and an operation executive module; wherein,
the monitoring module is arranged to:
receive the state monitoring policy, trigger a state monitoring operation according to the state monitoring policy, and report monitored state information; and
the operation executive module is arranged to:
receive operation information, and execute a state control operation according to the operation information.

8. The system according to claim 7, wherein, the state monitoring policy comprises:
a condition value needed to be satisfied by the M2M terminal device executing collection and reporting operations of a state parameter, and an identifier of the state parameter corresponding to the condition value, or
an event definition of the M2M terminal device executing event detection and reporting, and an event type identifier corresponding to the event definition;
the state control policy comprises:
a judgment logic of triggering the state control operation by the M2M platform based on the state parameter reported by the M2M terminal device, or a judgment logic of triggering the state control operation by the M2M platform based on the event type reported by the M2M terminal device.

9. The system according to claim 7, the system further comprising:
an M2M application, arranged to generate the state monitoring and control policy according to state monitoring and control requirements of the M2M terminal device, and send to the M2M platform through a policy issue message;
wherein the policy issue message comprises an identifier of the M2M terminal device and the state monitoring and control policy;
or, the system further comprising:
an M2M management, arranged to configure the state monitoring and control policy according to state monitoring and control requirements of the M2M terminal device, and input into the M2M platform through a local configuration instruction;
wherein the local configuration instruction comprises an identifier of the M2M terminal device and the state monitoring and control policy.

10. A machine-to-machine (M2M) terminal device, the M2M terminal device comprising a processor and a storage device, wherein the storage device stores processor-executable programs, and the programs comprise:
a monitoring module and an operation executive module; wherein,
the monitoring module is arranged to:
receive a state monitoring policy, trigger a state monitoring operation according to the state monitoring policy, and report monitored state information;
the operation executive module is arranged to:
receive operation information, and execute a state control operation according to the operation information,
wherein, the monitoring module is arranged to:
receive the state monitoring policy, obtain from the state monitoring policy the condition value needed to be satisfied by the M2M terminal device executing the collection and reporting operations of the state parameter and the identifier of the state parameter corresponding to the condition value, collect the state parameter corresponding to the identifier of the relevant state parameter and report the collected state parameter;
or, the monitoring module is arranged to:
receive the state monitoring policy, obtain from the state monitoring policy the event definition of the M2M terminal device executing the event detection and reporting and the event type identifier corresponding to the event definition, and report the event type identifier corresponding to the event definition when detecting occurrence of a relevant event according to the event definition.

* * * * *